_United States Patent_ [19]

Bogyos

[11] 3,744,888
[45] July 10, 1973

[54] METHOD OF MAKING CUSHIONED SPECTACLE FRAMES

[76] Inventor: Frank S. Bogyos, 2510 Lawn St., Racine, Wis. 53404

[22] Filed: Apr. 26, 1971

[21] Appl. No.: 137,622

Related U.S. Application Data

[62] Division of Ser. No. 835,996, June 24, 1969, Pat. No. 3,582,193.

[52] U.S. Cl. .................................. 351/178, 264/278
[51] Int. Cl. ...................... G02c 13/00, B29d 13/00
[58] Field of Search ........................... 264/275, 278; 29/450, 453; 351/178, 95, 99

[56] References Cited
UNITED STATES PATENTS 2,197,465  4/1940  Brunetti ........................... 264/275
2,060,094  11/1936  Martin ................................ 351/99

Primary Examiner—David H. Rubin
Attorney—Arthur J. Hansmann

[57] ABSTRACT

Athletic eye spectacles having a frame including a lens-holding piece and temples. The frame includes a covering of a coating material which is soft and resilient, while the frame has an inner core of a harder material for properly supporting the lenses. The coating material is sufficiently resilient or soft so that if the spectacles are hit, the wearer will not be injured, nor will the person who strikes the spectacles. The spectacles are made by placing the inner or base frame in a mold, and the coating material is poured into the mold in liquid form and is permitted to set around the base frame. Finally, the temple pieces are also coated and affixed to the lens-holding frame piece.

3 Claims, 8 Drawing Figures

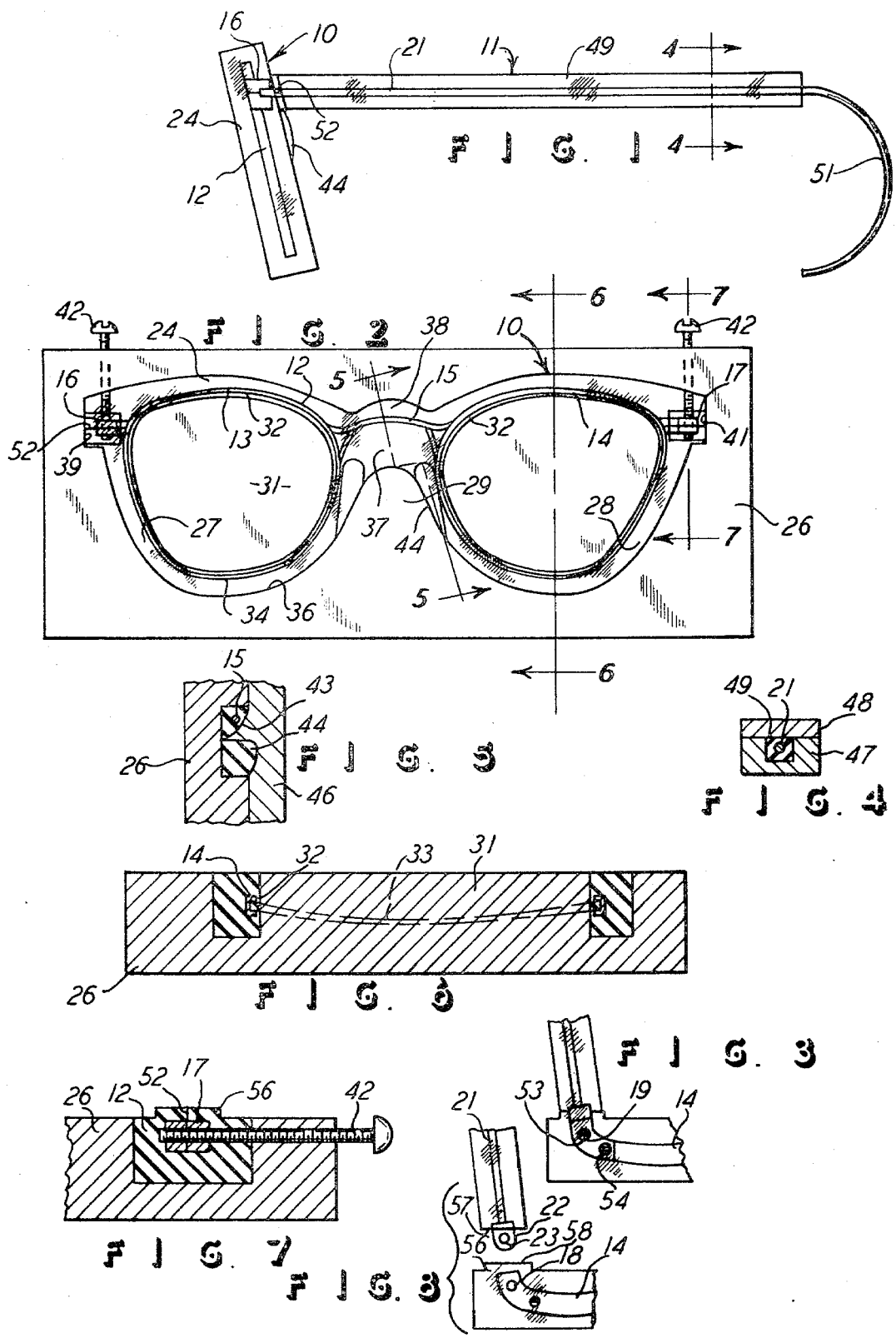

METHOD OF MAKING CUSHIONED SPECTACLE FRAMES

This is a division of U.S. Pat. application Ser. No. 835,996, filed June 24, 1969 and now U.S. Pat. No. 3,582,193.

This invention relates to athletic eye spectacles and method of making same. More particularly, the invention pertains to eye spectacles which can be worn by an athlete who is subjected to contact with other athletes or balls or the like, and the spectacles are designed to withstand the contact or impacts, without damage to the athlete or the object hitting the spectacles, and without damage to the spectacles.

BACKGROUND OF THE INVENTION

Athletic eye spectacles are already known, and they are known in different forms, including structures where an inner frame piece, such as a metal piece, is covered with a softer outer piece. The purpose is to protect the wearer from injury, and to also protect the spectacles from damage if and when the spectacles are hit in the athletic contest. One such example of spectacles is shown in U. S. Pat. No. 2,774,279 where the spectacles include a metal frame and the bridge is encircled with a rubbery material so that the spectacles rest on the wearer's nose by being supported thereon through the rubbery material. Also, portions of the temples and their mounting posts are covered with a rubbery material. However, the remainder of the spectacles is uncovered or unprotected in that no coating or rubbery material encases the remainder. Therefore, most of the spectacles is exposed and subject to damage, and it is also exposed and likely to injure the wearer if the spectacles are hit and pushed against the wearer's face.

The present invention improves upon athletic eye spectacles, and it does so by providing a pair of spectacles which is encapsulated and snugly covered with a soft, resilient, tough, rubbery material extending over the inner frame piece which is of a metal or like hard material suitable for holding the desired shape of the spectacles. Further, the present invention provides a method for making spectacles, and to have them made in a manner which permits them to accurately fit the particular user's face.

Still another object of this invention is to provide a pair of athletic eye spectacles which give maximum protection to the spectacles, to the wearer, and to the person who might strike the spectacles, and these objectives are accomplished with spectacles which minimize interference with the wearer's vision, in comparison to athletic eye spectacles of the prior art. In accomplishing this object, the spectacles of this invention are formed of a soft, resilient, tough, rubbery material which is translucent.

Still another object of this invention is provide athletic eye spectacles which are arranged to not only protect the spectacle frames but to also protect the spectacle lenses. In accomplishing this particular object, the frames are arranged to have the lenses supported in the rubbery coating material so that the lenses are actually cushioned in their mounting or support in the frames.

BRIEF DESCRIPTION OF THE DRAWINGS

FIG. 1 is a side elevational view of a preferred embodiment of this invention.

FIG. 2 is a plan view of a portion of the spectacles shown in FIG. 1 and with the mold shown.

FIG. 3 is a top plan view of a portion of FIG. 1.

FIG. 4 is a sectional view taken on the line 4—4 of FIG. 1.

FIG. 5 is a sectional view taken on the line 5—5 of FIG. 2, and being on a reduced scale.

FIGS. 6 and 7 are sectional views taken on the lines 6—6 and 7—7, respectively, of FIG. 2, and being on an enlarged scale.

FIG. 8 is a top plan view similar to FIG. 3, but with the two pieces shown separated from each other.

DETAILED DESCRIPTION OF THE PREFERRED EMBODIMENT

The spectacles generally include a front or lens-holding frame piece 10 and two temple pieces 11 connected to the lens-holding piece. The piece 10 has an inner frame or core 12 which is of a hard material, such as the usual metal material employed in eye spectacles. The piece 12 includes the two rims 13 and 14 and the nose bridge 15 which connects the rims 13 and 14, in the usual manner. Also, the piece 12 has the temple mounting posts 16 and 17 which have the usual screw openings 18 for receiving a screw 19 in securing the temples 11 to the front piece 10. Thus the temples 11 have a metal inner piece or core 21 which terminates in an enlarged end 22 having a hole 23 through which the screw 19 will pass in mounting the temples 11 on the front piece 10.

Thus the frame pieces 12 and 21 are generally of a conventional design, but they are covered with a rubbery coating material shown thereover. The front frame piece 12 has the coating material thereover and in form of the piece designated 24. The piece 24 is therefore also a frame piece and is considered to be the outer frame piece and it assumes the general shape of the inner frame piece 12, as best shown in FIG. 2.

FIG. 2 also shows that the lens-holding piece 10 is formed by suspending the inner frame piece 12 in a mold 26. The mold has the lens or eye opening cavities 27 and 28, and it also has the nose piece 29. It will therefore be seen that the mold 26 presents the eye piece bosses 31 in close proximity to the inner edges 32 of the frame eye pieces 13 and 14, and FIG. 6 also shows this relationship. FIG. 6 further shows that the frame pieces 13 and 14 are C-shaped in cross section, and a corrective lens can be positioned within the frame rims or pieces 13 and 14, as indicated by the dot-dash lines designated 33 in FIG. 6 which show the relative position of the lens to the frame.

In preference, the distance from the bosses 31 to the inner edges 32 of the rims 13 and 14 is one-half of a millimeter. Also in preference the distance from the outer surface or edges 34 of the rims 13 and 14 to the wall 36 defining the cavities 27 and 28 is 3 millimeters. Further, the span in the mold cavity in the area of the bridge 15 is greater than 3 millimeters in the dimension below the bridge 15 and constituting the area designated 37, and the dimension between the bridge 15 and the wall defining the mold cavity above the bridge 15, and designated 38, is also preferred to be three millimeters. Further, it will be noticed that the frame mounting posts 16 and 17 are spaced from the cavity walls 39 and 41.

With the frame piece 12 suspended in the mold 26, screws 42 are secured in the mold 26 and extend into the cavity and through the screw holes 18. In this manner the frame inner piece 12 is fully suspended in the mold 26 without touching any of the walls defining the mold cavity. The coating material 24 is then applied in the mold cavity by pouring the material 24 in a liquid form into the cavity. This causes the material 24 to encapsulate the inner frame 12, and it does so in the millimeter dimensions given. This includes the showing in FIG. 6 where the inner edges 32 of the rims 13 and 14 are covered with the coating material to a depth of one-half millimeter. Upon curing the liquid coating material, it becomes a solid material of a resilient, tough, and rubbery characteristic, as desired.

FIG. 5 shows that the coating material 24 has a formed nose piece along the curved surface 43, and the material 12 also has formed nose pads 44. This structure and method of making the spectacles therefore permits the shaping and fitting the spectacles to a particular size for certain users. That is, the mold bridge piece 29, and the other portions of the mold 26 can be of certain dimensions and relationships so that the resulting frame 10 will be of a size and fit desired.

Thus FIG. 5 shows that the mold piece 26 has a mating mold piece 46 which may be used to form the nose bridge described. Also, it will then be understood that FIG. 2 shows the frame piece 10 in a face-down position in the mold 26.

After the liquid forming the rubbery coating material 24 is cured, the frame piece 10 is removed from the mold pieces 26 and 46 and is joined with the two temple pieces 11. The temple pieces 11 are also made in a mold, such as shown in FIG. 4 with the mold pieces 47 and 48. Here the temple metal or core piece 21 is encapsulated or coated with the rubbery material described, and such material is indicated at 49. This material extends substantially throughout the length of the temple metal pieces 21, and except for the projecting temple piece 22 and the curved temple ear pieces 51, the coating 49 completely covers the temples 21.

In order to join the temples 11 to the frame piece 10, the material 24 adjacent the frame mounting posts 16 and 17 can be cut along a line 52 so that the temple ends 22 can be inserted into the material 24 and align the temple holes with the frame front piece hole 18. Then another opening can be made in the material 24 and the securing screws 53 can be inserted in the aligned holes 18 and 23. Also, the frame piece 12 has the usual separable ends at the mounting posts 16 and 17, and these ends are secured together by the usual screws 54 which pass through the screw holes which are not shown but are aligned with the frame screws 54, in the usual manner. The screw holes in the material 24, and the slit 52, can then all be again sealed with rubber cement so that the frame front piece 10 is completely finished in that it is covered with the desired rubbery material. Of course the corrective lenses, such as the indicated lens at 33, would be inserted in the rims 13 and 14 and cushioned by the one-half millimeter of rubbery material 24, prior to the closing of the rims 13 and 14 by the screws 54, as described. This cushions the lenses in the frames, and there is then less likelihood of damage to the lenses and of injury to the user.

In the aforegoing description, it will therefore be seen that the spectacles are formed of a relatively hard frame material at the inner core of the spectacles, and such material is preferable the metal used conventionally in the safety spectacles. Then the metal inner core is covered with the softer rubbery material which is formed by the molding process described. Also, the rubbery material is of a translucent characteristic so that the vision of the wearer will not be substantially hindered while the coating material is softer than the inner core material, and is more resilient than the inner core material, nevertheless the coating material is sufficiently sturdy to resist deflecting under the weight of the spectacles while they are in position on the wearer, so the corrective lenses will be properly positioned and retained in proper position on the wearer's face. Also, the coating material described then covers the entire frames, except for the ear pieces 51. The coating therefore includes the coverage of the temple ends 22, since they are inserted in the bosses or mass 56, and the coating material 57 on the temples 11 is then in snug contact with the coating material surface 58 on the front frame piece 10, as shown in FIG. 3 and as indicated in FIG. 8.

The coating material is a material designated 3140 RTV Protective Coating, manufactured by Dow Chemical Company and it is a rubber silicone which takes approximately 48 hours to cure and has a hardness of 25 on a Shore A scale durometer reading, and it has a tensile strength of 300 psi, and it is of a high degree of translucence. The elongation is 350 per cent, and tear strength is 20 ppi, Die B reading.

The aforementioned describes the structure as well as the method of making the spectacles. With regard to the method, it will therefore be understood that the spectacles are made by providing the metal frame core 12 and suspending it in a mold 26 by a suitable means, such as the screws 42. The liquid coating material is poured into the mold cavity, and the frame piece 12 is completely submerged in the liquid which is allowed to cure to the rubbery coating substance described. The screws 42 are then removed and then the front piece 10 can then be removed from the mold 26. Appropriate slits, such as the slit 52, can then be made in the front piece 10 and the lenses can be inserted in the rims 13 and 14 and the fastening screws 54 can then be placed on the frame core 12 to secure the lenses in place. Finally, the temples 11 can be formed in the mold pieces 47 and 48, and the temple ends 22 can be inserted through the slits 52, and the screws 53 can be positioned to secure the temples to the front frame piece 10. Finally, the holes in the material 24 for inserting the screws 53 and 54 can be cemented closed, and the slit 52 can also be cemented closed, and thereby the entire frame inner core, except for the ear pieces 51, will be encapsulated with the rubbery coating which is in full and snug contact with the inner core pieces 12 and 21, as described. Alternatively, the slit 52 could be avoided and the coating material stretched, rather than being cut, for insertion of of the lens.

What is claimed is:

1. A method of making athletic eye spectacles, comprising the steps of providing an eye spectacle frame piece with lens-holding rims and with temple posts separable for permitting insertion of lenses into said rims and with said temple posts having screw holes to permit said rims to be screw-retained closed and with said frame piece having a connecting nose bridge, suspending said frame piece in a mold having a cavity, positioning two threaded screws in said mold to be threaded therein and threadedly engaging each said screw hole with one of said threaded screws to retain said frame piece suspended in said mold cavity, selecting a hardenable liquid which cures to a resilient condition, introducing said liquid into said cavity and completely enclosing said frame piece with said liquid to a depth of several millimeters encapsulating said frame piece except on the inside edges of said rims, curing said liquid, removing said threaded screws from said screw holes and removing the encapsulated said frame piece from said mold, inserting lenses in said rims, and affixing temple pieces to said temple posts by inserting small screws into said screw holes.

2. The method of claim 1, including the steps of slitting the cured encapsulating material adjacent said temple posts and inserting an end of each of said temple pieces into a respective one of said slits, anchoring said temple pieces to said temple posts with said small screws, and sealing said slits.

3. The method of claim 1, including the steps of separating each of said temple posts to open said rims for insertion of said lens into said rims, and stretching said encapsulating material adjacent said temple posts for effecting the opening of said rims.

* * * * *